United States Patent [19]

Perkins et al.

[11] Patent Number: 4,790,974

[45] Date of Patent: Dec. 13, 1988

[54] METHOD FOR MANUFACTURING A VEHICLE CROSS-BEAM REAR AXLE

[75] Inventors: David J. Perkins, Ann Arbor; Louis D. Long, Rochester, both of Mich.

[73] Assignee: Chrysler Motors Corporation, Highland Park, Mich.

[21] Appl. No.: 126,322

[22] Filed: Nov. 30, 1987

[51] Int. Cl.$^4$ .................... B32B 31/06; B60G 11/18
[52] U.S. Cl. .................... 264/328.1; 156/242; 156/244.22; 156/245; 156/294; 264/46.5; 264/328.3; 264/328.8; 248/74.2; 248/74.3; 280/688; 280/689
[58] Field of Search ............... 156/242, 244.22, 245, 156/294; 280/688, 689; 248/74.2, 74.3; 264/328.1, 328.3, 328.8, 46.5

[56] References Cited

U.S. PATENT DOCUMENTS

| 3,966,009 | 6/1976 | Meacock et al. | 280/712 |
| 4,623,164 | 11/1986 | Cassel et al. | 280/689 |
| 4,637,628 | 1/1987 | Perkins | 280/689 |
| 4,750,757 | 6/1988 | Long | 280/689 |

*Primary Examiner*—Caleb Weston
*Attorney, Agent, or Firm*—Edward P. Barthel

[57] ABSTRACT

A method of manufacturing is disclosed for the installation of a one piece damper member for retaining the midpoint of a torsion tube on the torsional axis of a channel-shaped cross beam vehicle rear axle. The damper member is formed during the axle assembly line advancement by injecting a first mass of hardenable urethane paste material into a side gap portion and arcuate shaped central gap portion of a D-shaped recess defined intermediate the channel interior and the tube. A second mass of the urethane paste material is injected into the remaining side gap portion and channel upper open end space. As an adjunct to the axle being advanced through assembly line washing, wax coating and heat treating operations the first and second masses coalesce and attain an accelerated final curing of the tube retaining damper member.

2 Claims, 2 Drawing Sheets

METHOD FOR MANUFACTURING A VEHICLE CROSS-BEAM REAR AXLE

BACKGROUND OF THE INVENTION

This invention relates to a vehicle rear axle assembly and more particularly to a method for manufacturing a vehicle cross-beam axle incorporating an elastomeric damper member for securing an intermediate portion of a torque rod within the axle's channel-shaped cross-section.

The U.S. Pat. No. 4,750,757 issued June 14, 1988 to L. D. Long, and entitled, "Rear Axle Torque Rod Damper", discloses an elastomeric damper member for retaining an intermediate portion of the torque rod within an inverted channel-shaped cross-beam rear axle. As described in the Long patent a one-piece damper member is normally U-shaped in cross-section having an upwardly opening central bore defined by vertically extending leg portions and a base portion. The Long damper member is designed for compressed insertion into a D-shaped clearance between the channel and the rod such that its section is transformed from a U-shape to a C-shape so as to be lockingly retained under pressure in the clearance. Reference may be had to the Long disclosure for a detailed description of the invention.

SUMMARY OF THE INVENTION

It is a principal object of the invention to provide a new and improved method of manufacturing a cross-beam axle for a vehicle incorporating a damper member for resiliently retaining an intermediate portion of a torque rod disposed within the axle's channel-shaped cross-section.

It is also an object of the present invention to provide an improved method of manufacturing a cross-beam axle as set forth above wherein the damper is installed as part of the axle assembly line fabrication such that existing axle cleaning and coating operations are incorporated into the curing cycle of the urethane damper.

It is still another object of the present invention to provide an improved method of manufacturing a cross-beam axle as set forth above wherein the damper member may be installed in a semi-liquid or paste state which, upon curing, resiliently retains an intermediate portion of a torque tube while obviating the use of installation methods that subject the torque rod to possible deforming stresses.

The axle member has an inverted channel-shaped section defined by a half-round bight wall portion terminating in opposed side wall portions. The torsion tube is coextensive with the axle member such that its principal axis is located on the vertically disposed longitudinally extending plane of symmetry of the channel-shaped section. The tube principal axis is positioned a determined distance from the center of curvature of the axle member half-round bight wall portion. A D-shaped recess is thus formed between the channel interior surface and the tube.

In the preferred form of practicing the method of the invention the axle assembly is advanced along an assembly line in an inverted fashion by means of a conveyor driven hanger such that the open face of the U-shaped channel is directed upwardly. As a first step the hanger is positioned under one or more nozzles which are activated to supply a predetermined quantity or mass of a hardenable urethane paste material to one of the side gaps and the arcuate shaped gap via the upper open face of the inverted channel-shaped axle. One or more nozzles are then activated to supply a predetermined quantity or mass of the hardenable urethane paste to the remaining side gap and the space between the rod and the open end face of the channel-shaped axle.

A further feature of the invention is the use of a accelerated cure urethane sealant material for the dampener member which includes a cure accelerating paste material. The combined urethane sealant and paste material retains its shape within the D-shaped recess without a mold or guide for a sufficient time interval while being cured as an adjunct to the assembly line travel of the axle member through a plurality of axle processing heat treat zones.

As a second step the axle member is advanced at room temperature for a determined time interval providing a room temperature initial curing of the urethane material.

As a third step the axle member is advanced by the conveyor to a second axle washing station and subjected to a high temperature spray wash where the urethane material is cured by heat and the absorbtion of moisture in the spray water vapor phase.

As a fourth step the axle member is removed from the washing station and advanced to a third heat treat zone or station and held for a determined curing cycle wherein the axles are pre-heated at a selected elevated temperature for a predetermined time interval.

As a fifth step the axle is advanced to a fourth station providing a hot wax tank wherein the axle is submerged and held for a determined time interval in a liquid wax bath heated to a predetermined temperature.

As a final or sixth step the axle is advanced downstream to a fifth heat treat zone or station wherein it is subjected to a post heat treatment for a predetermined time interval thereby accelerating the curing of the urethane masses along with the wax coating on the axle.

In its fully cured form the urethane sealant and paste material masses coalesce providing a resilient dampening retention member at the torsion tube midpoint thus creating a vibrational stationary node at the midpoint. The dampening member dampens first and third nodal stationary wave bending amplitudes while allowing only second and higher nodal bending amplitudes of the tube. Thus, the damper member enables the tube to resist substantial vibratory forces of a cyclical character from the substantially continuous movement of the vehicle wheels relative to the vehicle frame caused by vibrations imparted from the roadway.

BRIEF DESCRIPTION OF THE DRAWINGS

Further features and advantages of the invention will become apparent to those skilled in the art upon reference to the following description and accompanying drawings in which.

DETAILED DESCRIPTION OF THE INVENTION

Figure 1:
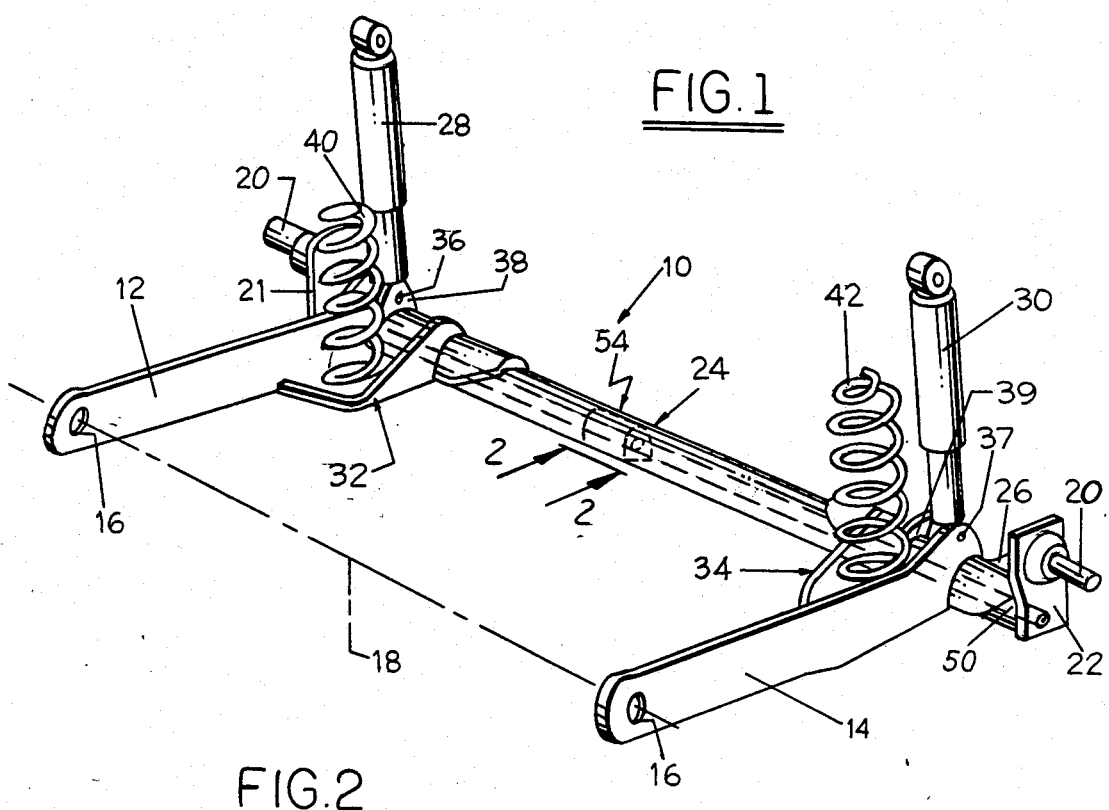
FIG. 1 is a perspective view of a vehicle crossbeam rear axle assembly incorporating the present.

Referring now to the drawings and in particular to FIG. 1, a rear suspension system is illustrated at 10 designed to be carried by a pair of longitudinally extending vehicle side rails (not shown), as depicted for example in the U.S. Pat. No. 4,637,628 issued Jan. 20, 1987, to D. J. Perkins. The Perkins patent is assigned to the assignee of the present application the disclosure of which is incorporated by reference herein.

The suspension system 10 consists essentially of a pair of longitudinally extending trailing control arms 12 and 14, adapted to be pivotally connected at their forward ends to the vehicle side rails by suitable pivot bushings (not shown) located in holes 16. Thus, the control arms 12 and 14 undergo opposite pivotal movement about their transverse pivotal axis 18 in response to opposite vertical deflection of the rear road wheels (not shown). The wheels are adapted to be suitably attached by spindles 20 bolted to right and left mounting plates 21 and 22, respectively.

A transversely extending rear cross-beam axle member, generally indicated at 24, extends between the mounting plates 21 and 22. The axle member 24 has upturned ends 26 suitably affixed to the mounting plates, as by welding. A pair of right and left shock absorber struts 28 and 30 of conventional design are interconnected between the motor vehicle body (not shown) and the axle member 24. Right and left spring mounting brackets 32 and 34 are fixedly secured inwardly from their associated control arms 12 and 14 of the axle member 24. Pivot bolts 36 and 37 are shown connecting the lower end of each shock absorber 28, 30 intermediate its associated bracket inboard ears 38 and 39, respectively, and the aft end of its associated control arm. The brackets 32 and 34 each have a horizontal spring seat portion extending forwardly from the axle member 24 which supports the lower end of its associated right and left coil springs 40 and 42, respectively. The frame side rails are each provided with an upper spring seat (not shown) so that the vehicle superstructure is resiliently supported relative to the road wheels.

Figure 2:
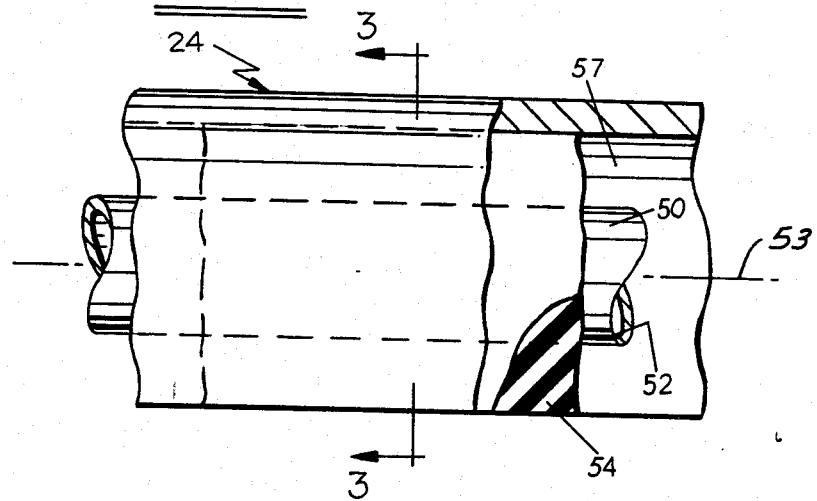
FIG. 2 is an enlarged fragmentary side elevational view of the channel axle member, with parts broken away, taken on the line 2—2 of FIG. 1.
Figure 3:
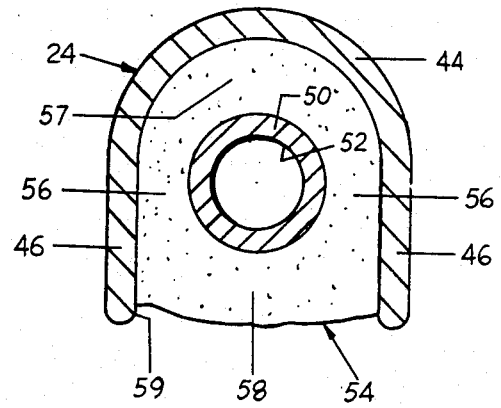
FIG. 3 is a transverse sectional view taken on the line 3—3 of FIG. 2.

As best seen in FIGS. 2 and 3 the cross-beam rear axle member 24 is an inverted channel with a U-shape transverse cross-section defined by an arcuate shaped or half-round bight wall portion 44 terminating in substantially vertically extending opposed side wall portions 46. A stabilizer bar or torsion tube, shown at 50 in FIG. 1-3, extends between the control arms 12 and 14 with its free ends projecting through aligned holes in the side mounting plates 21 and 22, and fixedly secured therein by welds. As seen in FIG. 3 the torsion tube 50 is preferably shown as a clyindrical hollow member having an axial internal through bore 52 having its principal axis 53 aligned on the torsional axis of the axle. It will be noted, however, that the tube 52 could be a solid member without departing from the scope of the invention. The tube 50 is held in substantially fixed relationship to the axle member 24 by virtue of its ends being anchored as by welding to the mounting plates 21 and 22, respectively. The tube 50 is shown secured to the axle member at its midpoint by a suitable damper member 54.

With reference to FIG. 3 it will be seen that the axle member 24 interior wall surface and the torsion tube exterior cylindrical surface define therebetween a generally D-shaped recess. The D-shaped recess includes a pair of left and right side gap portions 56, an arcuate gap portion 57 between the tube 50 and the channel half-round portion 44, and a central closure space 58 between the tube 50 and open end face 59 of the channel-shaped axle member 24. The damper member 54 is shown in FIGS. 1, 2 and 3 having a generally D-shape in cross section in the defining a plug or block formed of elastomeric, synthetic resin, or natural resin material. In the preferred form of the invention the damper member material is a urethane composition manufactured by the Essex Chemical Corporation, 1401 Broad Street, Clifton, N.J. 07015, and sold under the Trade Name "Beta-seal". The specific material may be purchased under the designation 551.2/551.0 Accelerated Cure Sealant and Paste. The Paste 551.0 is used to accelerate the cure of the Betaseal 551.2.

The urethane material is injected into a central portion of the axle member D-shaped recess extending a predetermined axial distance outboard from the axle member's midpoint. As discussed in U.S. Pat. No. 4,623,164 to Cassel, to provide a fixed torsion axis for the torsion tube 50 requires that it be secured at each end by suitable means such welding to the side plates 21 and 22, respectively. The torsion rod 50 must resist substantial forces of a cyclical character from the substantially continuous movement of the wheels relative to the vehicle frame due to roughness of the roadway. Thus, because of the resultant pressure on the axle member 24 vibrations in the first and third bending modes of the torsion rod are greatly reduced while the second and fourth and higher bending modes are unaffected. The largest bending amplitude, however, occurs in the first bending mode. As a result, installation of the single damper member 54 at the midpoint of the axle member provides a stationary nodal point so as to substantially reduce bending stresses in the torsion tube 50.

Figure 4:
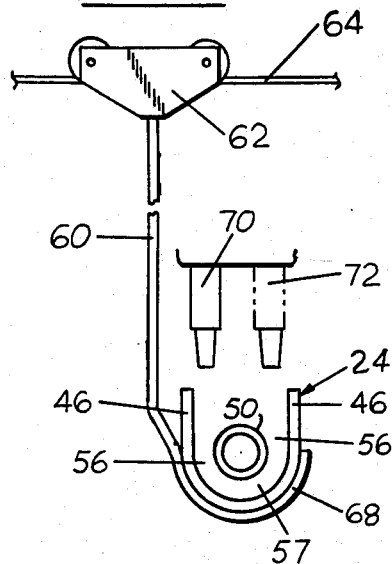
FIG. 4 is a schematic view, partially in section, of a portion of a vehicle axle wherein the axle is supported in an inverted manner on an assembly line conveyor hanger beneath a pair of dispensing nozzles.

A method of manufacturing the cross-beam axle member 24 incorporating the damper member 54 according to the present invention, is summarized in FIGS. 4 through 9 of the drawings. As illustrated in FIG. 4 the cross-beam axle member, including its side plates 21 and 22 and torsion tube 50, is suspended by hook-like hangers 60. The hangers 60 are suitably supported by conveyor means for advancing the axle members 24 along an assemble line such as by electric self propelling conveyor wheeled carriers 62 supported on overhead conveyor rails 64. Each axle member 24 is supported in an inverted manner with its channel-shaped open end face 59 directed upwardly and its arcuate bight wall portion 44 nested in hook portion 68 of the hangers 60.

As a first step in the method of installing the damper members 54 involves the conveyor means advancing each axle member 24 to a first station shown in FIG. 4. At the first station each axle member 24 is halted for a predetermined time interval beneath nozzle means such as a pair of nozzles 70 and 72. Once the nozzles 70 and 72 are aligned with their respective left and right side gaps 56 a first predetermined quantity of a semi-liquid mass of hardenable elastomeric material is fed into the left gap 56 and the arcuate gap 57 through the supply nozzle 70. Once the left and arcuate gaps are filled the supply of the elastomeric material to the nozzle 70 is terminated. A second predetermined quantity of a semi-liquid mass of hardenable elastomeric material is now fed into the right gap 56 and the open end covering space 58 through the supply nozzle 72 thereby defining the damper member 54.

Figure 5:
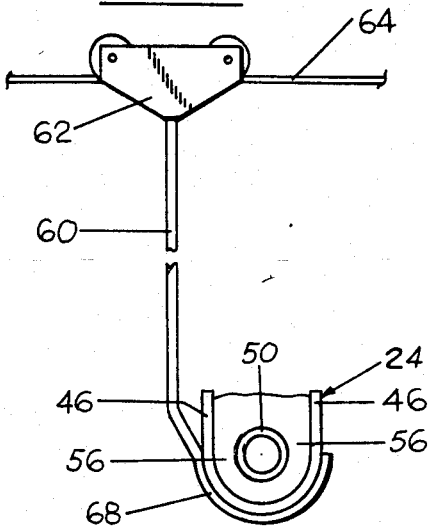
FIG. 5 is a schematic view similar to FIG. 4 wherein the axle member is shown moved downstream from the dispensing nozzles.

During the second step shown in FIG. 5 the conveyor carrier 62 advances the axle member 24 downstream on the assembly line allowing the two masses of elastomeric material to coalesce into a single D-shaped mass of material during its initially curing phase at room temperature.

Figure 6:
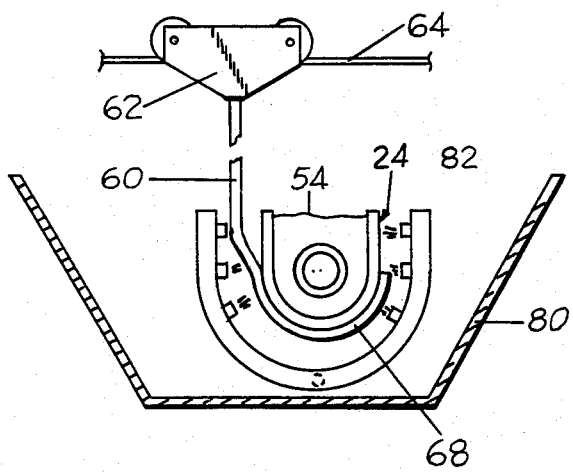
FIG. 6 is a schematic view similar to FIG. 5 wherein the axle member is shown subjected to a hot water spray wash.

As a third step the conveyor carrier advances the axle member 24 to a second machining oil cleaning station shown in FIG. 6 wherein it is lowered into a tank 80 and surrounded by a plurality or bank of spray nozzles 82. The axle member is then subjected to a hot water wash spray 83 maintained at a temperature of about 140 degrees F. In the disclosed form the axle member is enveloped in hot water vapor or steam-like atmosphere producing an accelerated curing phase for the damper material 54. The axle member is held in the tank 80 for a predetermined minimum time interval of at least two minutes.

Figure 7:
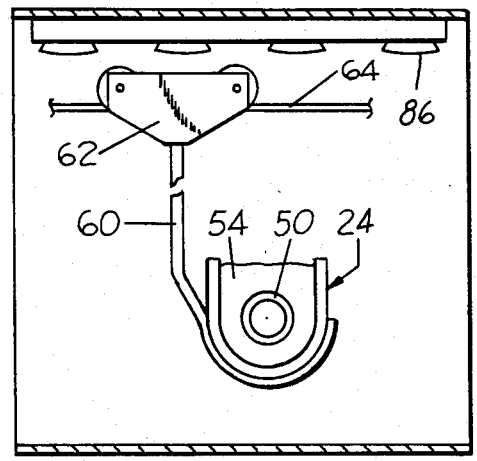
FIG. 7 is a schematic view similar to FIG. 6 showing the axle member advanced to a first heating zone.

A fourth step involves removing the axle member 24 from the washing spray tank 80 and the conveyor advancing it to a third heat treat station or heating zone shown in FIG. 7. The axle member is held in the third heating zone for a predetermined curing cycle time interval of about ten minutes wherein the axle member is pre-heated to a selected elevated temperature of the order of 230 degrees by suitable heating means such as gas heaters 86. During this fourth step the coalesced urethane single mass of material substantially attains its full thermal set or cure thereby providing an elastomeric damper 54 which resiliently retains the midpoint of the torsion tube 50 on its predetermined torsion axis within the channel-shaped cross beam axle.

Figure 8:
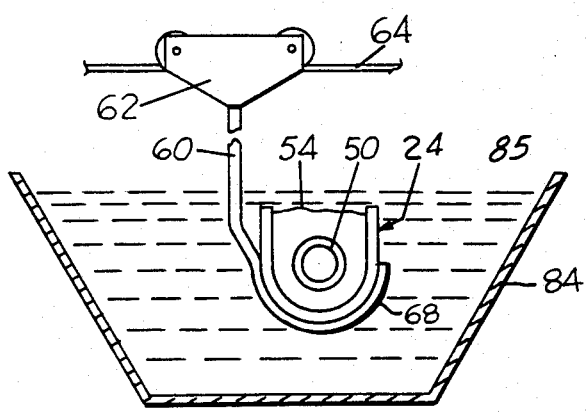
FIG. 8 is a schematic view showing the axle member advanced to a dipping tank.

FIG. 8 shows a fifth step wherein the conveyor advances the axle member 24 to a fourth station having a tank 84 filled with hot wax 85 maintained at a temperature of about 235 degrees F. The axle member is held submerged in the hot wax of tank 84 for a predetermined time interval of about three minutes such that when it is withdrawn it is coated with the wax material. The wax coating provides a corrosion preventative barrier.

Figure 9:
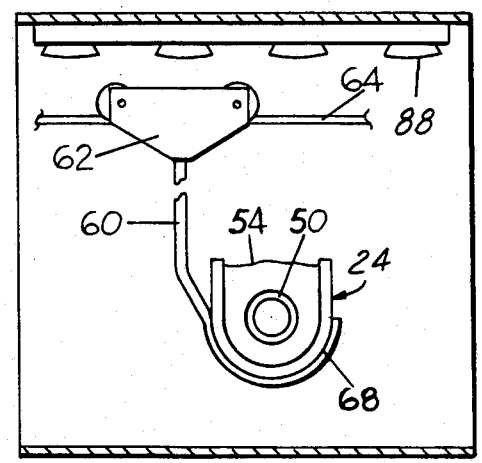
FIG. 9 is a schematic view showing the axle member advanced to a second heating zone.

As a sixth step the axle member is withdrawn from the tank 84 and advanced to a fifth station shown in FIG. 9. The fifth station consists of a second post heating zone wherein gas heaters 88 heat the axle member 24 to a predetermined temperature of about 230 degrees for a time interval of about five and one half minutes wherein the wax coating on the axle member is cured.

It will be noted that the present invention has particular application in situations requiring a one piece block-like damper member such as shown and described in the above mentioned Long patent application, for example. The Long damper member is a premolded C-shaped elastomeric block which is installed by being compressed into the axle D-shaped recess at its midpoint. Such compression would subject the hollow torsion tube 50 to loading stresses causing possible misalignment and/or permanent distortion. It will be appreciated that the novel method of the instant invention eliminates the application of such installation forces on the torsion tube 50. Further, the damper members 54 are incorporated as an adjunct to the assembly line travel of the axle member 24 through its washing and wax coating operation.

Obviously, many modifications and variations of the present invention are possible in light of the above teaching. It is therefore to be understood that within the scope of the appended claims, the method may be practiced otherwise than is specifically described.

What is claimed is:

1. A method for manufacturing a vehicle cross-beam axle in which;
    a vehicle cross-beam axle member is an inverted channel with a U-shaped cross-section defined by a half-round bight wall portion terminating in opposed side wall portions;
    a circular sectioned torsion tube coextensive with said axle member having its principal torsional axis positioned in a vertically disposed, longitudinally extending plane of symmetry of said axle member within the confines of said channel-shaped axle member, said wall portions and said torsion tube defining a generally D-shaped recess therebetween;
    and wherein said D-shaped recess defines a pair of side gaps between said tube and its associated side wall portions together with an arcuate shaped gap located between said tube and said channel-shaped beam interior wall surface;
    which method comprises:
    positioning said cross-beam axle member such that the open face of its U-shaped channel is directed upwardly;
    injecting into one of said side gaps and said arcuate shaped central gap a first mass of hardenable urethane paste material via said open end face;
    injecting into the remaining one of said gaps and said central space a second mass of hardenable urethane paste material;
    permitting said masses of urethane paste material to coalesce into one integrated semi-rigid D-sectioned mass conforming to said recess by cooling at room temperature for a predetermined time interval;
    advancing said axle member to a second station and subjecting said axle member to a hot water washing spray having a temperature of about 140 degrees F. thereby immersing said coalesced mass of urethane material in a heated water vapor atmosphere for a predetermined time interval thereb accelerating the curing cycle of said coalesced mass of urethane material; and
    advancing said axle member to a third station wherein said axle member is preheated to a temperature of about 230 degrees F. for a predetermined time interval providing for a pre-wax set whereby said coalesced mass of urethane material is substantially fully cured into a one-piece damper member retaining said tube midpoint in said axle member.

2. The method as set forth in claim 1, wherein said urethane material is Betaseal 551.2/551.0.

* * * * *